United States Patent [19]

Burnham

[11] 4,423,953
[45] Jan. 3, 1984

[54] HIGH INTENSITY LIGHT SOURCE
[75] Inventor: William W. Burnham, Mineola, N.Y.
[73] Assignee: Hazeltine Corporation, Greenlawn, N.Y.
[21] Appl. No.: 248,771
[22] Filed: Mar. 30, 1981
[51] Int. Cl.³ .............................................. G03B 27/54
[52] U.S. Cl. ....................................... 355/70; 355/38; 355/68
[58] Field of Search ..................... 362/276; 355/37, 38, 355/70, 77, 68

[56] References Cited

U.S. PATENT DOCUMENTS

| 3,887,279 | 6/1975 | Rubin | 355/38 |
| 3,923,394 | 12/1975 | Frankiewicz | 355/70 X |
| 4,050,808 | 9/1977 | Gyori et al. | 355/38 |
| 4,068,943 | 1/1978 | Gyori | 355/77 X |
| 4,124,292 | 11/1978 | Van Wandelen | 355/70 X |

Primary Examiner—Richard A. Wintercorn
Attorney, Agent, or Firm—E. A. Onders; F. R. Agovino

[57] ABSTRACT

A reflective tunnel of rectangular cross-section with opposing parallel or converging, opposing sides has a light diffuser located at the output opening of the tunnel for integrating the light passing therethrough and a densitometer located near the input opening of the tunnel for measuring the composition of the light within the tunnel. A lamp is positioned at the inner focal point of each of a plurality of dichroic elliptical reflectors which are supported at the input opening of the tunnel so that light emitted by each lamp is projected into the tunnel directly toward the light diffuser. The lamps are symmetrically disposed about the optical axis of the reflective tunnel and the reflector axes intersect the axis of the reflective tunnel at a point which is located between the midpoint of the reflective tunnel and the output of the tunnel. In a preferred embodiment, compensating means are located in a plane defined by the outer focal points of the elliptical reflectors to compensate for variations in the reflector/lamp alignment.

10 Claims, 8 Drawing Figures

HIGH INTENSITY LIGHT SOURCE

BACKGROUND OF THE INVENTION

1. Field of the Invention

The invention generally relates to light sources and, in particular, to a small format, high intensity additive light source for use in color photograph printers in which control of the spectral content of the printing illumination is desired.

2. Description of the Prior Art

The use of an integrating or mixing chamber in light sources is well known in the prior art. Various attempts have been made in an effort to obtain a high level of light diffusion with the proper spectral content and high intensity. For example, it has been suggested that a light integrating or mixing chamber having a rectangular cross-section and tapering sides with multiple admitting ports in the sides be employed. The admitting ports are then provided with individual color filters positioned thereover so that the light injected through the various ports will possess different colors. This arrangement was suggested in place of directly illuminating a diffusing plate in order to permit the light integrating or mixing chamber to serve the dual purpose of mixing different color light energies and, at the same time, rendering the resulting illuminant diffuse. For example, U.S. Pat. No. 4,050,808 teaches the use of specularly reflective surfaces and nonspecularly reflective surfaces in order to diffuse the illuminant. However, there have been practical difficulties in such suggested constructions, including the result that some areas of the output are more strongly illuminated than others thereby causing spots to appear in a print when the output is used to expose the print. In addition, the overall intensity of the resultant illuminant is reduced when mixing chambers are used to indirectly provide the illuminant.

SUMMARY OF THE INVENTION

It is an object of this invention to provide a light source which provides high intensity light of selected spectral compositions of uniform intensity over the aperture which may be measured and consistently controlled.

It is another object of this invention to provide a light source which is particularly suitable for the exposure of color photographic prints.

The light source according to the invention comprises a reflective tunnel having a rectangular cross-section forming openings defining an input and an output. A translucent substrate is located over the output opening of the tunnel for integrating the light incident thereon. A plurality of dichroic elliptical reflectors having inner and outer focal points are associated with a plurality of lamps such that each lamp is located at the inner focal point of the reflector associated therewith. The reflectors direct light emitted by the lamps at a point of aim located on the optical axis of the reflective tunnel between the midpoint of the reflective tunnel and the output thereof. The reflectors direct light emitted by the lamps into the reflective tunnel and directly toward the semi-transparent sheet. A nonintegrating textured substrate of transparent material is located in a plane defined by the outer focal points of the reflectors, between the lamps and the semi-transparent sheet. A densitometer is located at the input of the reflective tunnel for measuring the composition of light within the tunnel.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
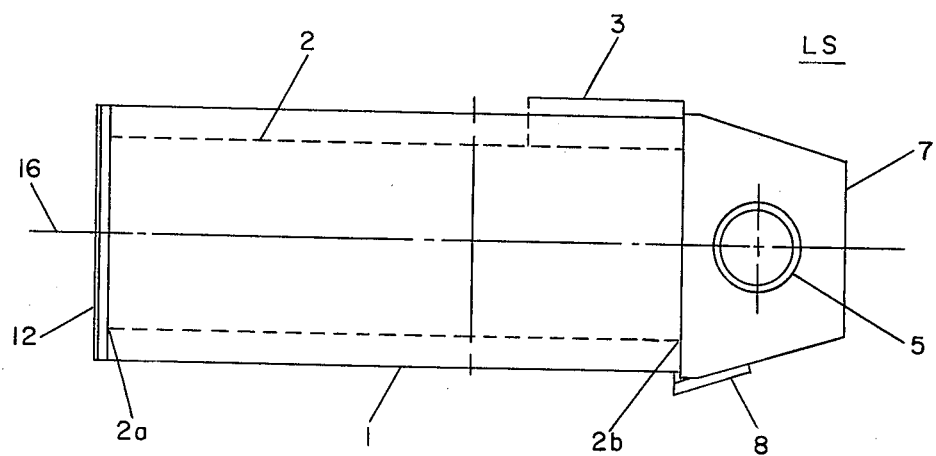
FIG. 1 is a side view of a light source according to the invention.
Figure 2:
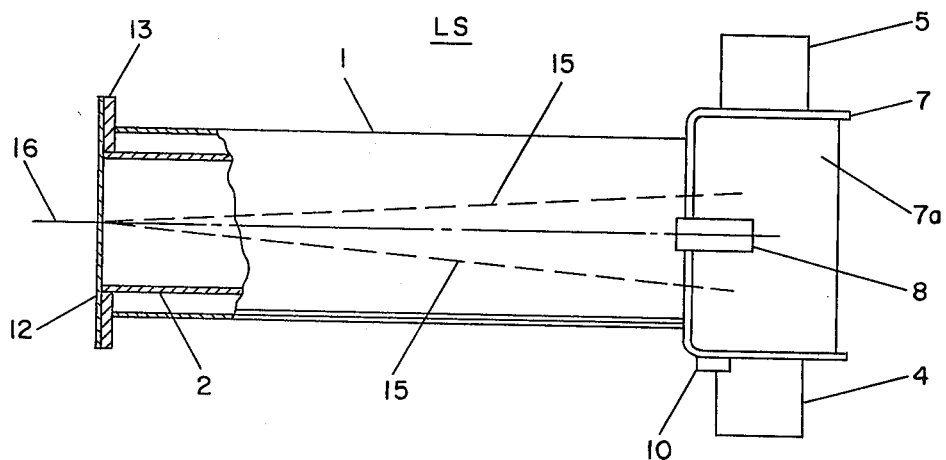
FIG. 2 is a top view of the light source as illustrated in FIG. 1 with part of the housing broken away.

Referring to FIGS. 1 and 2, the light source LS according to the invention comprising housing 1 supporting a reflective tunnel 2 with a diffuser 12 at the output opening 2a thereof and a lamp housing 7 at the input opening 2b thereof. A densitometer 3 comprising optoelectronic sensors and related electronics is located adjacent to the lamp housing 7 and is directed toward the light within the tunnel 2 for monitoring the composition of light within the reflective tunnel 2. Measurements from densitometer 3 may be used to determine or control the spectral composition and intensity of the light within tunnel 2 as is well known in the prior art and disclosed in U.S. Pat. Nos. 3,887,279 and 4,068,943. Preferably, densitometer 3 is located near the input opening 2b to avoid interfering with the mixing of light which occurs within the reflective tunnel 2 near the output opening.

The lamp housing 7 is provided with cooling air inlet 4 and cooling air outlet 5, as illustrated in FIG. 2, to allow air to be circulated through the lamp housing 7 for cooling the lamps therein. The lamp housing 7 is provided with a U-shaped lamp housing cover 7a which engages the lamp housing by means of cover latch 8. The lamp housing 7 also supports a connector 10 through which power to the lamps within the lamp housing 7 may be connected.

The reflective tunnel 2 may be constructed of any highly reflective material for directing light from the lamps within housing 7 to the diffuser 12. Housing 1, which supports tunnel 2, is provided with flanges 13 which assist in supporting the light source. For example, the flanges 13 may engage the underside of an exposing table of a printer on which negatives and photographic paper would be placed over and near the diffuser 12 to expose the photographic paper through the negative.

Figure 3:
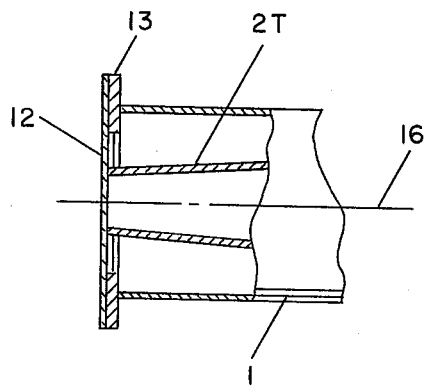
FIG. 3 is a partial top view of an alternative embodiment of the invention with part of the housing broken away.

In the embodiment as illustrated in FIGS. 1 and 2, reflective tunnel 2 has a square or rectangular cross-section with opposing parallel sides. However, in an alternative embodiment, reflective tunnel 2T may be formed in the shape of a truncated pyramid, as illustrated in FIG. 3, having a rectangular or square cross-section with opposing sides which converge toward the output opening 2a. Alternatively, the opposing sides may diverge away from the output opening 2a. A converging, truncated pyramid shape for the reflective tunnel 2 is particularly useful in an application where high intensity light within a limited area is required. A diverging tunnel would be useful for exposing formats which are larger than the input cross-section of the tunnel.

Figure 5:
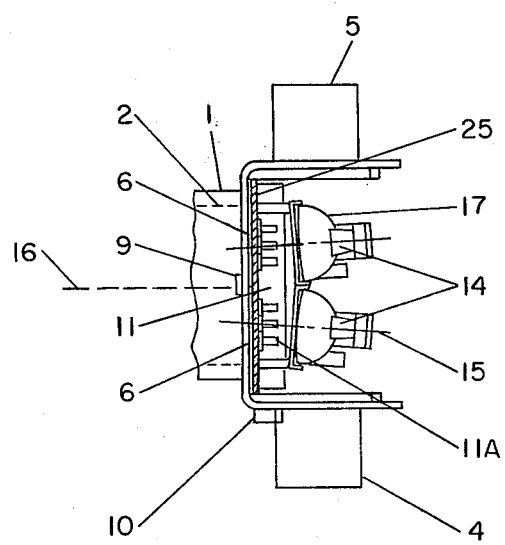
FIG. 5 is a side view of the lamp housing with the lamp housing cover removed.

The lamp housing 7 is illustrated in detail in FIG. 5. The housing 7 includes at least one lamp 14 for providing light for projection into the reflective tunnel 2. The lamps 14 are electrically connected (not shown) to connector 10 and are supported by reflectors 17 which reflect light from the lamps directly into the reflective tunnel 2 and directly toward diffuser 12. In particular, the reflectors comprise dichroic or cold-mirror coated elliptical reflectors having inner and outer focal points. The reflectors 17 are supported by bracket 11 provided with vents 11a to facilitate movement of the cooling air throughout the entire lamp housing 7. FIG. 5 illustrates a side view of a preferred embodiment of lamp housing 7 which includes four lamps 14, two of which are illustrated. However, the lamp housing 7 may be provided with any number of lamps. In the preferred embodiment illustrated, the lamps are located symmetrically about the optical axis 16 of the reflective tunnel such that the lamps 14 and reflectors 17 are located within the cross-sectional area defined by the sides of reflective tunnel 2. Furthermore, the lamp housing may be provided with filters and/or means for compensating for the alignment between the lamps 14, reflectors 17 and diffuser 12. The filters and/or means for compensating are preferably supported at the input opening 2b between the lamp housing and the tunnel 2. In particular, the compensating means may be a non-integrating textured substrate 25 of transparent material such as non-glare glass or a corrective lens. When filters of differing spectral characteristics are associated with the lamps 14, densitometer 3 may be used to sense the intensity and spectral characteristics of the light in the tunnel 2.

Figure 4:
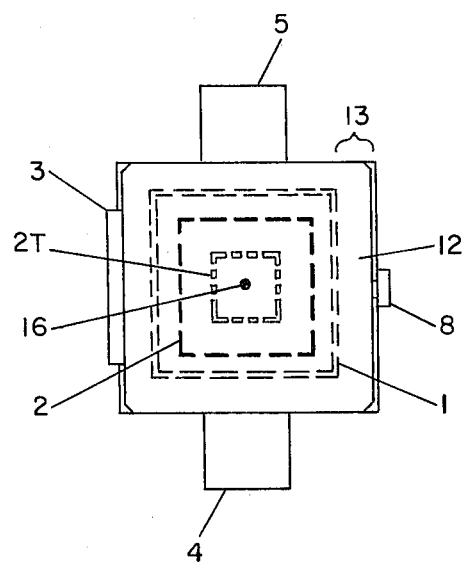
FIG. 4 is a front view of the diffusers of FIGS. 2 and 3 superimposed upon each other.

FIG. 4 is a front view of diffuser 12 comparing the relative locations, with respect to the diffuser 12, of the reflective tunnel 2 having parallel sides, the truncated reflective tunnel 2T and the flange 13 projecting from the housing 1.

An important feature of the invention is that the lamp housing 7 supports the lamps 14 such that the focal axes 15 of the reflectors 17 converge at a point located on the optical axis 16 of reflective tunnel 2. This geometry of the light source according to the invention is particularly illustrated in FIG. 6. Line M-M identifies the plane located at the midpoint between the ends of reflective tunnel 2. Line P-P defines the plane within which the diffuser 12 is located. According to the invention, reflectors 17 are configured to reflect light from the lamps such that the focal axes of the reflectors 17 intersect at a point located between the midpoint of reflective tunnel 2, indicated by line M-M, and the output of reflective tunnel 2, which supports the diffuser 12 and is indicated by line P-P. In effect, this results in the intersection point of the focal axes of the reflectors 17 being located on the optical axis 16 somewhere between points 18 and 19.

Figure 6:
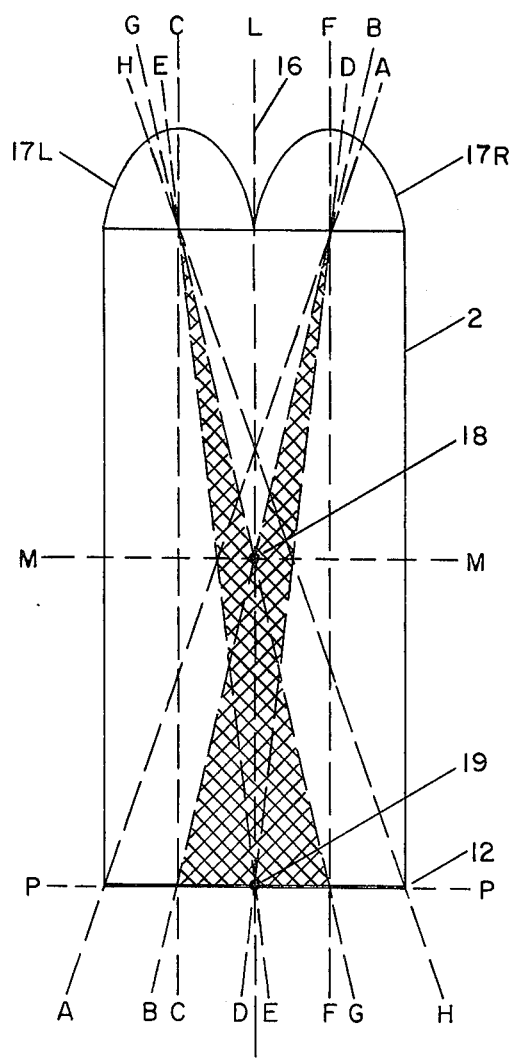
FIGS. 6 and 7 are longitudinal cross-sectional illustrations of the reflective tunnel indicating aspects of the geometry of the light tunnel according to the invention.

It has been found that significant improvements in the quality and quantity of light provided through diffuser 12 can be achieved by locating the convergence point of the focal axes of reflectors 17 between points 18 and 19. Locating the convergence point between points 18 and 19 means that the convergence point may be at point 18 or at point 19 or anywhere therebetween. Lines A-A through G-G of FIG. 6 represent various positions of the focal axes of reflectors 17 which project a beam of light to either side of each focal axis. Line G-G illustrates the focal axis of reflector 17L when it is configured to pass through point 18. Similarly, line B-B illustrates the focal axis of reflector 17R when it is configured to pass through point 18. Line E-E indicates the focal axis of reflector 17L and line B-B indicates the focal axis of reflector 17R when these reflectors are configured to have their focal axis pass through point 19. Therefore, the shaded areas defined by lines E-E and G-G and lines B-B and D-D indicate the preferable area within which the focal axes of the reflectors 17L and 17R, respectively, may be located in order to achieve the results contemplated by the invention.

One reason for the increased quality and quantity of light provided through diffuser 12 when the above-discussed geometry is employed in a light source is the amount and angle of light provided by the lamps 17 to the diffuser 12. The light intensity is significantly increased because light emitted by the lamps 14 toward the diffuser 12 is projected directly through the reflective tunnel 2 and directly at diffuser 12. As pointed out above, most prior art devices attempt to premix the light by directing it toward the walls of reflective tunnel 2 which significantly decreases intensity.

It is contemplated that lamps 14 may be halogen cycle projection lamps with integral dichroic elliptical reflectors and optical filters forming additive source. Frequently, the filament/reflector alignment of these lamps is not exact and it is necessary to employ means for compensating for the alignment between the filament and reflector. It has been found that the nonintegrating, textured substrate 25 located adjacent to the lamps 14 between the lamps 14 and the diffuser 12 achieves this result. In a preferred embodiment, this textured substrate 25 may comprise nonglare glass. The use of substrate 25 is distinguishable over the prior art systems which have employed integrating diffusers similar to diffuser 12. In contrast, such integrating diffusers comprise a translucent plastic sheet such as white Plexiglas. Comparatively, substrate 25 may have a transmissivity on the order of 90% whereas diffuser 12 may have a transmissivity on the order of 25%.

Figure 8:
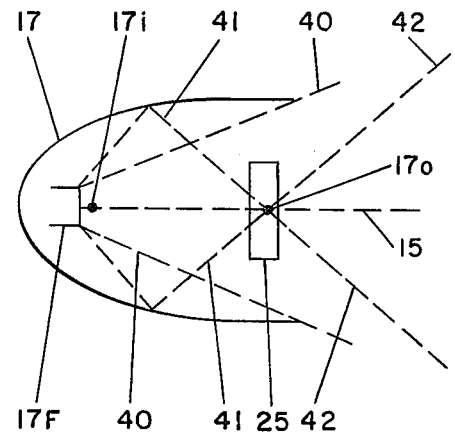
FIG. 8 is an illustration of the orientation between the lamp filament, reflector and compensating means.

Reflectors 17 are preferably elliptical reflectors which provide diverging light beams from the lamps 14 located at their focal point. Specifically, as illustrated in FIG. 8, reflector 17 is a dichroic or cold-mirror coated elliptical reflector with inner focal point 17i and outer focal point 17o. Filament 17f of the lamp associated with the reflector is positioned at or immediately behind the inner focal point 17i so that light emitted by the lamp and incident on reflector 17 converges at outer focal point 17o. Compensating means 25 is positioned at outer focal point 17o. This configuration allows compensating means 25 to be relatively small since light incident on reflector 17 converges at the outer focal point 17o. As shown in FIG. 8, light emitted by filament 17 toward compensating means 25 forms a slightly diverging beam 40 which passes through compensating means 25. Light emitted by filament 17 and incident on reflector 17 is reflected into a converging envelope 41 and through compensating means 25 into a diverging envelope 42.

In such a construction, if the focal axes 15 of the reflectors 17 are aimed at the walls of reflective tunnel 2 as suggested by lines A-A and H-H of FIG. 6, the result is that a significant amount of light must be reflected by the walls of reflective tunnel 2 before this light reaches diffuser 12. This significantly reduces the intensity of light within tunnel 2 and provided to diffuser 12, and is undesirable. On the other hand, if the reflectors 17 are structured to project the light directly toward diffuser 12 as illustrated by lines C-C and F-F, the spectral quality and uniformity of the light is significantly affected because insufficient overlap of the light reflected from reflectors 17L and 17R occurs and the light passing through diffuser 12 suffers from insufficient mixing resulting in nonuniformity.

Figure 7:
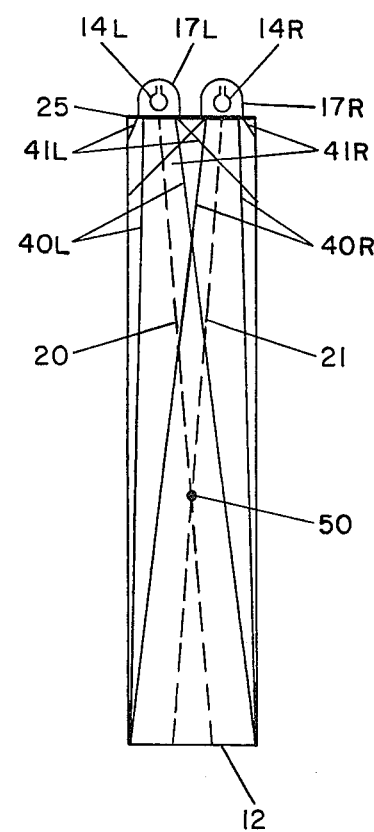

FIG. 7 further illustrates the geometry of the light source according to the invention wherein dichroic elliptical reflectors 17 are aimed at point 50 such that the focal axes 20 and 21 of reflectors 14L and 14R, respectively, intersect at aiming point 50. Reflector 17L has lamp 14L located at its inner focal point. A slightly diverging beam of light is provided by lamp 14L including light emitted toward compensating means 25 and defined by lines 40L. Similarly, reflector 17R has lamp 14R located at its inner focal point. A slightly diverging beam of light is provided by lamp 14R including light emitted toward compensating means 25 and defined by lines 40R. Light emitted by lamp 14L and incident upon reflector 17L forms diverging beam 41L of light. Light emitted by lamp 14R and incident upon reflector 17R forms diverging beam 41R.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A light source comprising:
a reflective tunnel having openings defining an input and an output;
a plurality of lamps;
light diffusing means located at the output opening of said tunnel for integrating the light incident thereon;
first means for supporting said lamps at the input of said reflective tunnel for directing light emitted by said lamps into said reflective tunnel and directly toward said light diffusing means;
means for aiming light emitted by each of said lamps at an aiming point located on the optical axis of said reflective tunnel, said aiming point being located between the midpoint of said reflective tunnel and the output of said reflective tunnel;
said means for aiming including a plurality of elliptical reflectors each having an inner and an outer focal point, each said reflector associated with one of said lamps such that said lamp is located at the inner focal point of said reflector associated therewith, the focal axes of said reflectors intersecting at said aiming point;
second means for compensating for the alignment between each of said lamps, said means for aiming and said light diffusing means so that light emitted by said lamps is aimed directly toward said light diffusing means;
said second means including a substrate located at the input opening of said reflective tunnel, the outer focal points of said reflectors located in the same plane as the substrate; and
third means located at the input of said reflective tunnel for sensing a characteristic of the light within said tunnel and for controlling said lamps in response to the sensed characteristic.

2. The light source of claim 1 wherein said aiming point is located at the midpoint of said reflectve tunnel.

3. The light source of claim 1 wherein said aiming point is located in a plane defined by said light diffusing means.

4. The light source of claim 1 wherein said lamps are symmetrically located about the optical axis of said reflective tunnel.

5. The light source of claim 1 wherein said reflective tunnel has a rectangular cross-section.

6. The light source of claim 1 wherein said reflective tunnel has opposing parallel sides.

7. The light source of claim 1 or 5 wherein said reflective tunnel is a truncated pyramid.

8. The light source of claim 1 wherein said light diffusing means comprises a translucent substrate located over the output opening of said reflective tunnel for integrating the light rays incident thereon.

9. The light source of claim 1 wherein said substrate comprises a nonintegrating, textured substrate of transparent material.

10. The light source of claim 9 wherein said nonintegrating, textured substrate comprises nonglare glass.

* * * * *